United States Patent [19]

Takenouchi et al.

[11] 4,177,487

[45] Dec. 4, 1979

[54] FACSIMILE SCANNER

[75] Inventors: Mutsuo Takenouchi; Takashi Ozawa; Syoji Wako; Satoru Itoh, all of Ebina, Japan

[73] Assignee: Fuji Xerox Co., Ltd., Tokyo, Japan

[21] Appl. No.: 891,249

[22] Filed: Mar. 29, 1978

[30] Foreign Application Priority Data

Apr. 11, 1977 [JP] Japan ................................. 52/40440
Apr. 26, 1977 [JP] Japan ................................. 52/437311
Apr. 26, 1977 [JP] Japan ................................. 52/47312

[51] Int. Cl.$^2$ ............................................. H04N 1/04
[52] U.S. Cl. ............................... 358/294; 313/105 CM
[58] Field of Search ................... 358/285, 293, 294; 313/374, 379, 381, 105 R, 105 CM; 315/12 R

[56] References Cited

U.S. PATENT DOCUMENTS 2,846,500  8/1958  Neeb ................................. 358/294 X

*Primary Examiner*—Robert L. Richardson
*Attorney, Agent, or Firm*—Sughrue, Rothwell, Mion, Zinn and Macpeak

[57] ABSTRACT

An electro-optical picture signal processing system, wherein an optical image is converted into time sequential electrical picture signals, or, conversely, time sequential electrical picture signals into an optical image or an electrostatic latent image, is provided with an electron emission plane arranged in one-dimension, a control electrode positioned face to face with said plane to control the passing of electrons from the electron emission plane, a secondary-electron multiplying device yielding secondary-electrons in response to the electrons passing through the control electrode, and an anode collecting the multiplied secondary-electrons. At least one of the electron emission plane and the control electrode is divided into a number of segments each as large as a picture-element, arranged in one-dimension, and one of the segments is selected from one end to the other. When an optical image is converted into time sequential electrical signals, the number of the electrons passing through a selected segment portion is controlled in response to brightness of each picture-element of the optical image. On the other hand, when time sequential electrical signals are converted into an optical image or an electrostatic latent image, the potential difference between the selected part of the electron emission plane and the control electrode is controlled by time sequential picture signals.

16 Claims, 12 Drawing Figures

FACSIMILE SCANNER

FIELD OF THE INVENTION

The present invention relates to an electro-optical picture signal processing system for converting an optical image into time sequential electrical signals, or, conversely, converting time sequential electrical picture signals into an optical image or an electrostatic latent image, and in particular to an electro-optical picture signal processing system capable of multiplying secondary-electrons and of scanning the electrode segments arranged in one-dimension.

DESCRIPTION OF THE PRIOR ART

There is known a variety of document readers, for converting an optical image into sequential electric signals, such as image pick-up tubes, solid state imaging elements, and photomultiplier tubes combined with flying-spot tubes or scanning laser beam. Especially in recent years, image-intensifiers employing channel plates as a picture signal amplifying device were put into practice and some of them have been placed on the market.

SUMMARY OF THE INVENTION

An object of the present invention is to provide an electro-optical picture signal processing system which converts an original picture or an information on a document into time sequential electrical signals with high resolving power and high speed, or, conversely, converts time sequential electrical signals into a picture, a letter, and the like.

Another object of the present invention is to provide an electro-optical picture signal processing system minimized in consumption of electric power, small in size and low in cost due to utilization of the secondary-electron multiplying devices and one-dimensional scanning means.

Further objects and advantages of the invention will be apparent from the following detailed description to be read in conjunction with the accompanying drawings.

DETAILED DESCRIPTION OF THE INVENTION

Figures 1, 2, 3:
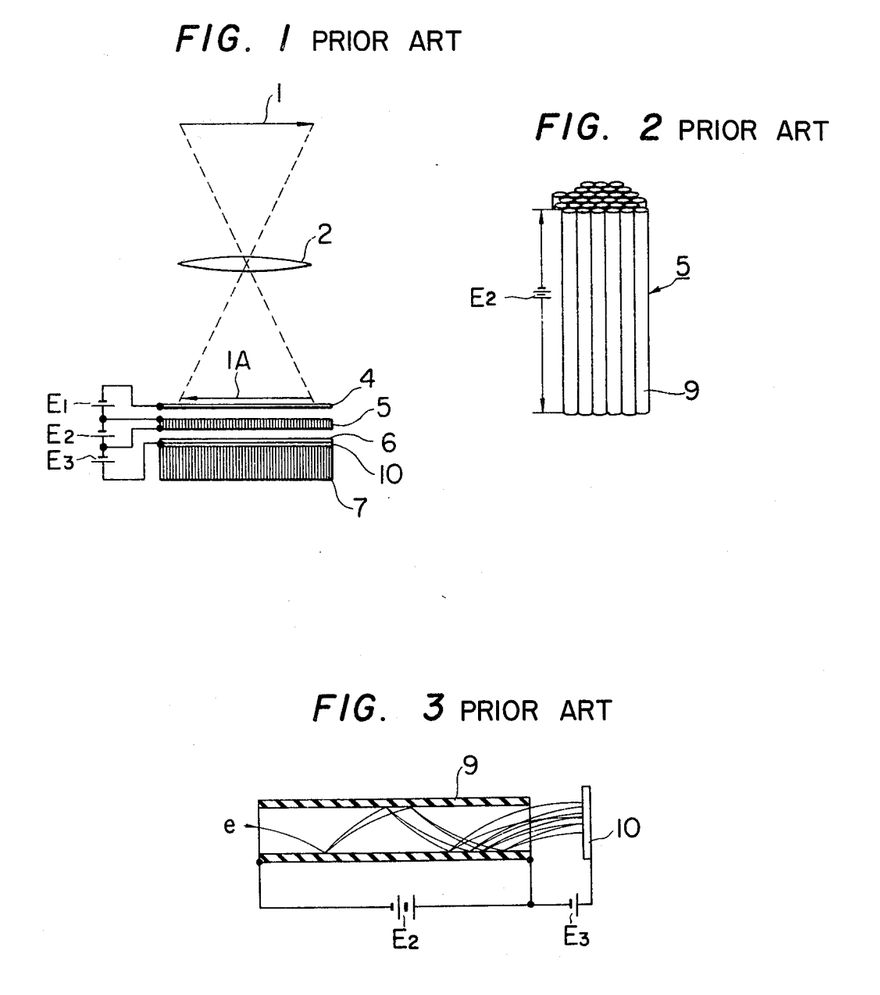
FIG. 1 is a schematic illustration of a prior art image intensifier including a secondary-electron multiplier.
FIG. 2 is a magnifically perspective view of a portion of the secondary-electron multiplier in FIG. 1.
FIG. 3 is a schematic illustration of secondary-electron multiplying mechanism.

Referring first to FIG. 1, there is illustrated a prior art image intensifier including a secondary-electron multiplying plate made by Galileo Electro-Optics, Co., Ltd., wherein an image 1A of a subject 1, such as a document or scenery, is focused on a photocathode 4 by a focusing lens 2. Electrons emitted from photoelectric surface of the photocathode 4 in response to an image 1A projected thereon are directed to a secondary-electron multiplier 5. The secondary-electron multiplier 5 is, as shown in FIG. 2 in a partially expanded view, composed of a bunch of secondary-electron multiplier tubes 9, each of which has a diameter of several ten $\mu m$, and DC voltage $E_2$ is applied across the ends of the tube. FIG. 3 is a schematic view of a secondary-electron multiplying mechanism of a multiplier tube 9, wherein electrons e entered at the left side in the drawing are multiplied by means of a cascade method, so that the number of the secondary-electrons taken out of the anode 10 will be thousands of times the number of the input electrons. As the secondary-electron multiplier 5 has such structure as a bunch of tubes 9, the multiplied output electrons are associated with the input electrons at their respective tubes. In FIG. 1, when the multiplied electrons collide with the fluorescent body 6 on the anode 10, an intensified visible image is produced. This image is sent through optical fibers 7. This structure, with the aid of optical fibers 7 for image transmission and a photosensitive film placed at an output end of the fibers, can be used for a low -light- level camera which intensifies a weak image taken by a wave length converter camera or a telescope. The system of FIG. 1 can be used in a gate control type (high speed) camera, such as a streak camera, if a mesh grid is inserted between the cathode 4 and the secondary electron multiplier 5, or an ON-OFF control of power sources $E_2$ and $E_1$ is carried out. However, in order to realize a high order of resolving power, such as 10 lines/mm in said secondary-electron multiplier 5, the number of the pipe-type multiplier tubes 9 required to be bundled are $10^4$ for every square centimeter. Therefore, this system has such disadvantage as high in cost. Furthermore, with the secondary-electron multiplying system having a metallic mesh for gate control, simultaneous ON-OFF control of the two-dimensional image is possible; however, the information contained in the picture element can not be converted into time sequential signals.

On the other hand, in the prior art, mechanical scanning systems, electronic scanning systems and the like are known as scanning type picture recording systems. The electronic scanning systems are mainly used for the purpose of the high speed recording or reading. A multistylus type and an electrostatic recording tube type devices are already known as electrostatic recording systems. The multistylus system needs a large number of electronic driver circuits that can stand a high voltage applied directly to the stylus electrodes; therefore it is difficult to fabricate the system with an integrated circuit and to reduce the cost. In the electrostatic recording tube type, the electron beam deflecting circuit is so complicated that it is difficult to make small in size and to decrease cost.

Figure 4:
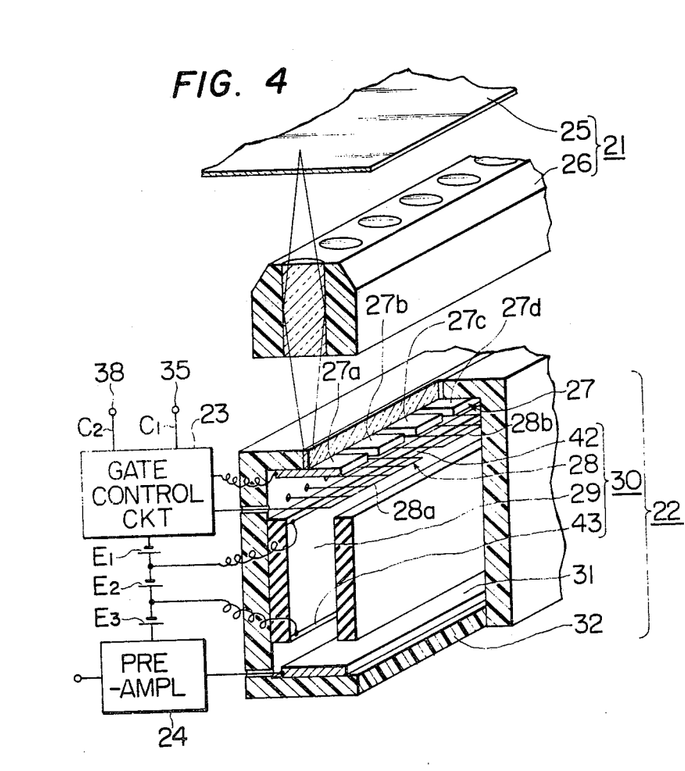
FIG. 4 and FIG. 5 are partially sectional schematic perspective views of the first and the second preferred embodiment of this invention, respectively.

FIG. 4 is a partially sectional schematic perspective view of the first embodiment of this invention. An electro-optical picture-signal processing system, i.e., a document reading system, of the present invention comprises an optical system 21 for forming an image of document, a photoelectron multiplier type photo-electric converting device 22, a gate control circuit 23 and a pre-amplifier 24. It is well known to these skilled in the art that it is enough to add a mechanical scanning device for moving the document or the sensor to a one-dimensional scanning system, in order to convert such information as pictures and letters on an original document into time sequential electric signals. Hence, hereinafter the following detailed description is given with regard only to a one-dimensional scanning system and its function.

The optical system 21 is composed of a plate glass 25 and optical lens 26 (e.g., SELFOC LENS made by Nippon Sheet Glass Co., Ltd.), with its focusing plane being on the photocathode 27. Instead of the SELFOC-lens, an ordinary focusing lens may be used. The photocathode 27 is divided into a number of segments each having the size of the picture element and arranged in one-dimension; in addition those segments are electrically insulated from each other and supplied with their respective voltages. If the conversion of information on a document into electric signals is required to have such accuracy of resolving power for reading as 8 lines per millimeter, the segment size of the photocathode 27 may be 100 $\mu m \times 100$ $\mu m$, and its pitch 125 $\mu m$. The photo-electric converting device 22 is composed of a photocathode 27, a secondary-electron multiplying device 30, an anode 31, and an evacuated housing 32 which contains said elements each positioned in said order. The device 22 is connected with the grid control circuit 23 for one-dimensional scanning and with the pre-amplifier 24 for amplifying the detected signal.

The photocathode 27 is a vacuum evaporated film of Sb-Cs, Ag-O-Cs or Ag-Bi-O-Cs which is divided into a number of electrically discontinuous segments 27a, 27b . . . Each segment is made by means of mesh screen evaporation and chemical treatment with cesium vapor, and forms a one-dimensional photoelectrical plate. The multiplying device 30 is composed of a gate electrode 28 at the end where electrons enter, secondary-electron multiplying plates (continuous dinode) 29 placed in parallel with each other to make a space for the electron path therebetween, and electrodes 42, 43 respectively form the secondary-electron multiplying plates 29. Though the grid electrode 28 is illustrated as a number of thin conductors arranged in parallel in FIG. 4, in practice it may be replaced by a metallic mesh having holes through which photoelectrons can pass. Besides, the grid electrode 28 consists of a plurality of large segments 28a, 28b . . . , each having such size as to be able to control passing of electrons from one or more photocathode segments simultaneously. Any conductive material such as gold, silver, aluminum, tungsten, or stainless alloy, etc., may be used as the grid electrode 28. The secondary-electron multiplying plate (continuous dinode) 29 is a combination of two parallel insulated substrates, each having an inner surface on which a layer for emission of secondary electrons is formed. Materials for the secondary-electron multiplying plate 29 are usually PbO glass a surface of which is converted to n-type semiconductor by hydrogen reduction process, inorganic substances such as semiconductor ceramic mainly composed of barium titanate and semiconductor ceramic mainly composed of tin oxide, or organic substances such as polyethylene, polyvinyl chloride and polystyrene. The anode 31 may be a metallic or a glass plate on which aluminum is vacuum evaporated. The anode is positioned near the output end of the secondary-electron multiplying plates 29.

Figure 6:
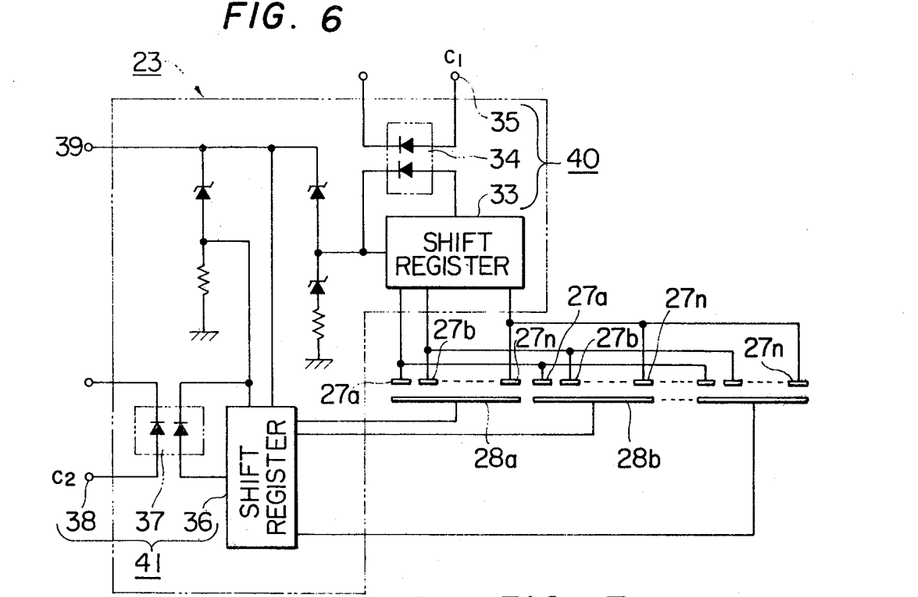
FIG. 6 is a block diagram of the driving circuit for illustrating the scanning action in the embodiments.

FIG. 6 illustrates an embodiment of the gate control circuit 23. Photocathode scanning circuit 40 includes a multiplexor or a shift register having a counter (e.g., SN74154 made by TI Co., Ltd.) or a ring-counter 33, a photocoupler 34 and input terminals for clock pulses 35. The photocathode segments are divided into many groups each of which has the same number of segments 27a–27n. Cathode segments at the same relative position in the respective groups are connected together to their respective output terminals of the ring-counter 33. A grid electrode scanning circuit 41 includes ring-counter 36 usually having the same structure as said ring-counter 33, a photocoupler 37 and input terminals for clock pulses 38. The outputs of the ring-counter 36 are delivered to the gate electrodes 28a, 28b . . . A power source is connected to the terminal 39. Each of the gate electrode segments 28a, 28b . . . , facing a group of photocathode segments 27a, 27b . . . 27n, are for control of the photoelectrons passing therethrough.

When a clock signal $C_1$ is supplied to the terminal 35, one of the output terminals of the ring-counter 33 is turned into its ON state while the others remain in their OFF state with the aid of a built-in address counter (not illustrated). In this embodiment, each output terminal voltage is $-503$ volts in the ON state and $-497$ volts in the OFF state. When a clock signal $C_2$ having a pulse repetitive period n times as large as that of the clock signal $C_1$ (n stands for the number of photocathode segments within a group) is supplied to another terminal 38, one of the output terminals of the ring-counter 36 is turned ON and the others remain OFF due to the operation of a built-in address counter (not illustrated). In the present embodiment, each output terminal voltage is $-500$ volts in the ON state and $-506$ volts in the OFF state.

Figure 7:
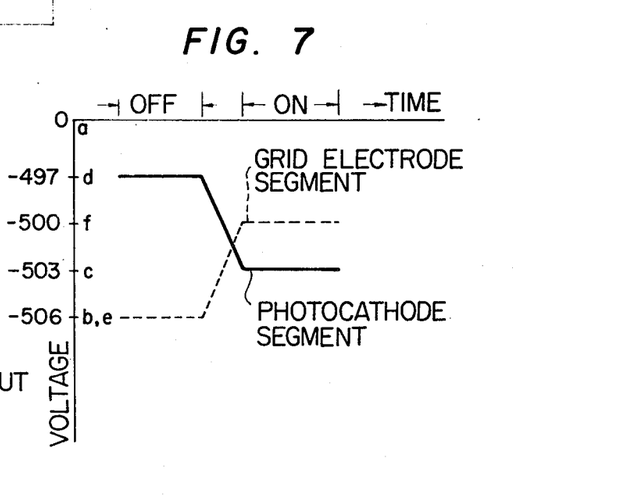
FIG. 7 is a graph illustrating electric potentials of the control grid and the photocathode in scanning.

In FIG. 7, a solid line and a dotted line respectively illustrate how the voltages of the photocathode segments and the grid control segments vary from ON to OFF states. The grid electrode segment becomes higher in voltage than the photocathode segments facing thereto, and hence positively biased with respect to the photocathode only when the both segments are in the ON state simultaneously. Therefore, only when the both segments are in the ON state and the light is projected on the said photocathode segment, photo-electrons emitted from the segments of the photocathode 27 are attracted to the grid electrode 28. Because of the high voltage gradient between the dinode terminal 42 and the grid electrode, almost all of said photoelectrons are attracted to and collide with the secondary-electron multiplying plates 29. Since those electrons hit the secondary-electron yielding plane 29 to liberate an increased number of electrons therein, the number of electrons emitted from the other end or output is several times as large as that of the input in order of figure. The multiplied electrons are captured at the anode 31. An electric current produced at the anode circuit is amplified by a pre-amplifier 24 and picture-element signals are obtained by detecting the electric current. In FIG. 6, in accordance with the arrival of each said clock signal $C_1$, one of the photocathode segments is turned on by the ON state of the corresponding grid electrode segment, so that activation of photocathode segments is shifted for example from the left end 27a to the right end 27n, whereby the one-dimensional scanning of the photocathode segments is achieved.

Figure 8:
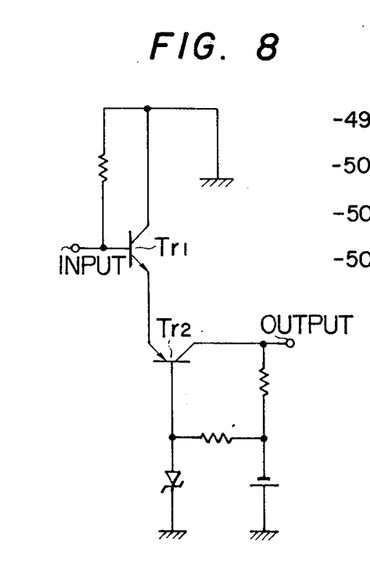
FIG. 8 is a circuit diagram of a pre-amplifier suitable for said each embodiment.

FIG. 8 illustrates a preferred circuit embodiment of the pre-amplifier 24 of the present invention. As the original output signal level at the anode 31 is so small, a current amplification type circuit with low input impedance and quick response, as illustrated, is preferred.

According to the present invention, it takes a very short time, less than 10 nano sec., for obtaining output signals at the anode 31 after the photoelectrons leave the photocathode 27. Such high speed operation as 100 MHz may be possible if only time for photoelectric conversion is taken into consideration. Further, the one-dimensional scanning is performed with a low voltage signal, such as a few volts, and the power consumption is small because the secondary-electron multiplying devices are of parallel flat plate type. Thus, a document reading system which is compact, low in cost and high in operation speed can be provided. Moreover it is obvious that the document reading system capable of scanning in arbitrary width is obtained by choosing suitable lengths of the photocathode and the control grid electrode arranged in one-dimension, and minimization of size of the photocathode segments leads to the improvement of resolving power. Besides, according to this invention, the brightness of the light source required for illuminating the document is less than that of the sources in the prior art so that a small and simple light source may be employed.

Figure 5:
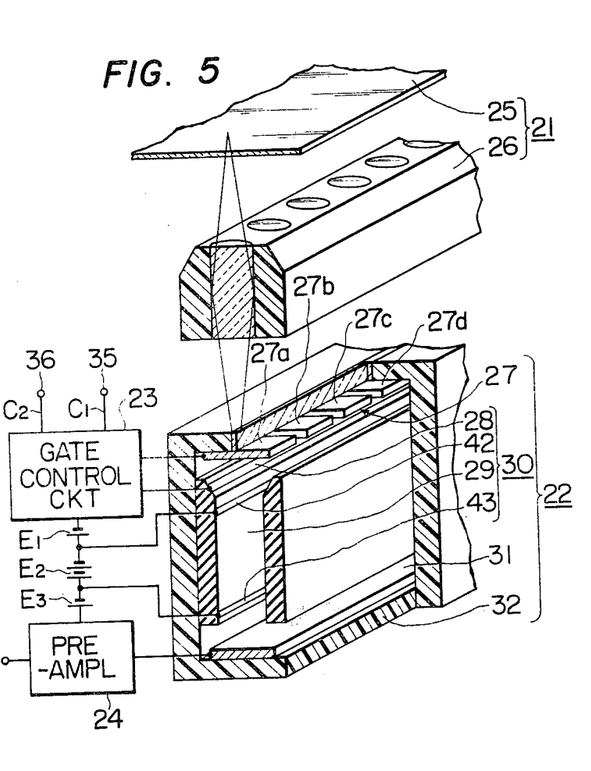
Figure 9:
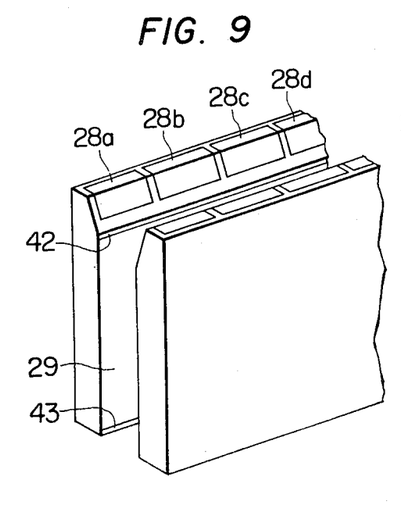
FIG. 9 is a partially enlarged perspective view of the secondary-electron multiplying plane and the grid electrode in the second embodiment.

FIG. 5 is a partially sectional schematic perspective view of the second embodiment of this invention, and the same or equivalent parts as those in FIG. 4 are denoted by the same reference symbols. In comparison with the one in FIG. 4, this embodiment is characterized by a grid electrode 28 and a secondary-electron multiplying plate 29 formed on a single insulating substrate. FIG. 9 is an enlarged perspective view of a part of the grid electrode 28 and the secondary-electron multiplying plate 29. Each of the grid electrode segments 28a, 28b . . . is, as in the first embodiment, placed face to face with a corresponding group of the photocathode segments 27a, 27b . . . 27n, and serves to gate the photoelectrons emitted from the photocathode segment. As the driving circuit is the same in structure and function as that in FIG. 6, detailed description of it is omitted.

The inventors employed the arrangement of parts illustrated in FIG. 5, and the scanning control circuit 23 in FIG. 6 in their trial model. Fujinon EPF 5-6/f90 mm made by FUJI PHOTOFILM CO., LTD. was used as an optical lens in the optical system 21 for forming an image duplicating a document. The photocathode scanning circuit 40 in the control circuit 23 was composed of two 16-gate shift registers with built-in counter (said SN 74154), a photocoupler, and three Zener diodes, etc. The grid electrode scanning circuit 41 was composed of a shift register of the type mentioned above and a photocoupler, etc. Each photocathode segment 27a . . . 27n stayed at −497 volts in the OFF state and −503 volts in the ON state. On the other hand, the grid electrode segment 28a, 28b . . . stayed at −506 volts in the OFF state and at −500 volts in the ON state. Consequently, when said both electrode segments were in the ON state, the potential of the grid electrode became +3 volts higher than that of the photocathode. PbO glass plates of 10 mm×10 mm×50 mm were used as the substrates of the multiplying plates 29. Each plate was polished after one end was tapered. Over the tapered part seven thin films of gold of 4 mm width were provided by means of evaporation for forming separate grid electrode segments 28a, 28b . . . Two of those plates, with their surfaces other than the parts forming secondary-electron multiplying surfaces covered by protection film, were put in a reduction furnace kept at 350°–400° C. to form continuous dinodes 29. After the dinode voltage supplying terminals 42, 43 were attached to these multiplying plates 29, these two plates were mounted in face to face relation with 100 μm thick spacers (not shown) in between. The anode 31 was a 200 μm×50 mm of aluminum film evaporated on a glass substrate. For making the photocathode 27, Sb evaporation and cesium vapor obtained by heating $CS_2CrO_4$ were adopted. The size of each segment was 100 μm×100 μm, and the segments were placed one for every 125 μm over 50 mm. After formation of the photocathode 27, various processes were performed in the vacuum. The housing 32 was shielded in a vacuum with indium so that it was able to handle in the air. When an one-dimensional optical image pattern was projected on the photo-cathode 27 by the optical system 21, the scanning control circuit 23 was activated, and the electric signals obtained from the pre-amplifier 24 were applied to a storage type oscilloscope; a wave form displayed on a screen perfectly coincided with the original image pattern.

In said second embodiment, since the grid electrode 28 and the secondary-electron multiplying plates 29 are arranged on a common substrate it has the additional advantages that its manufacturing, assembling and adjusting processes are simple, and also its mechanical strength increases.

Figure 10:
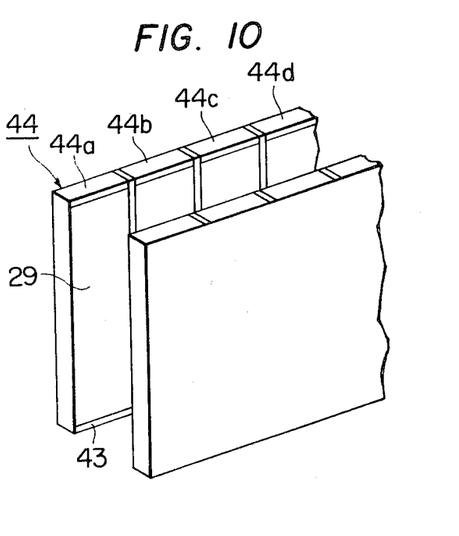
FIG. 10 is a partially enlarged perspective view illustrating another example of the secondary-electron multiplying plane and the grid electrode.

FIG. 10 is a partially sectional schematic perspective view of another example of the secondary-electron multiplying plate which may be employed in said embodiments. The grid electrode and the secondary-electron multiplying surface are not separated for insulation, but arranged continuously on a common substrate. One side 44 of the substrate is used as the grid electrode consisting of a number of segments 44a, 44b . . . , and each secondary-electron multiplying plate 29 is divided into a number of segments extending in the direction the electrons travel. It is obvious that the apparatus of this example has the same function and effect as those of the apparatus according to said second embodiment. Moreover, the similar function and effect will be realized even if the division of the secondary-electron multiplying plates 29 in the direction the electrons travel is not made throughout the length extending from the input to the output of the electrons, but only near the input of electrons, where most of the voltage is dropped in order to attract the electrons.

Figure 11:
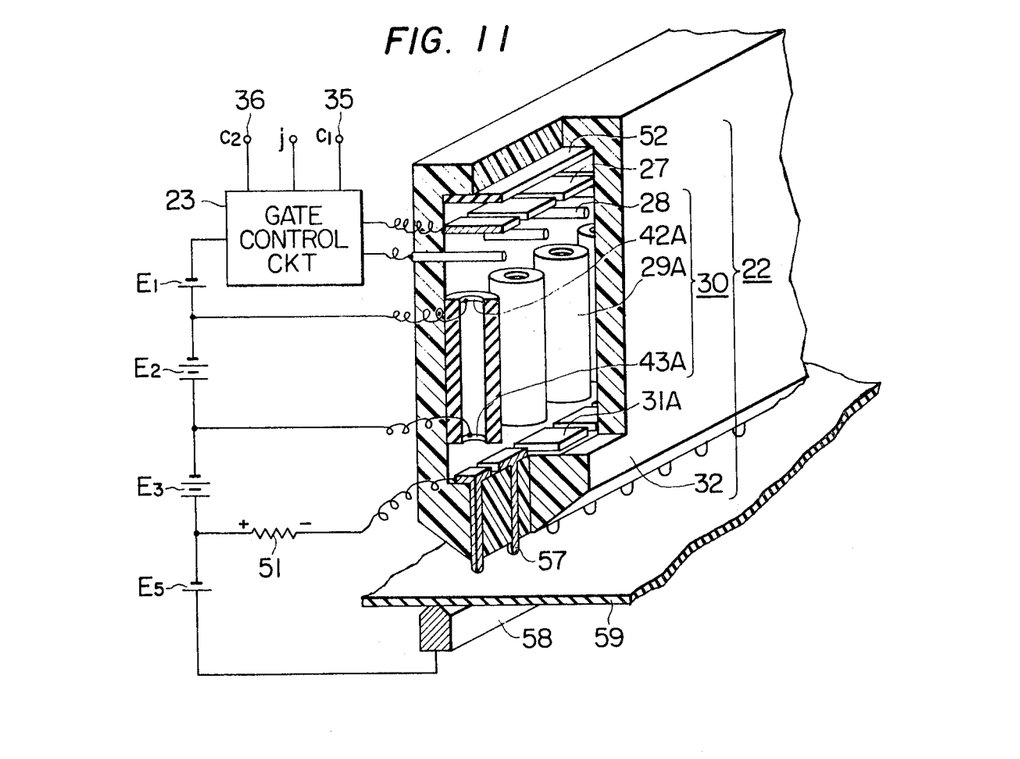
FIG. 11 is a partially sectional schematic perspective view of the third preferred embodiment of this invention.

FIG. 11 is a partially sectional schematic perspective view illustrating further embodiment of this invention, wherein a secondary-electron multiplying function and a one-dimensional electrode segment scanning function according to the present invention are applied to an electro-optical picture signal processing system or a picture signal recording system which converts time sequential picture signals into an optical image such as a letter and a graphic picture, etc., or an electro-static latent image. In the figure, the parts denoted by the same reference symbols as in FIG. 4 and FIG. 5 show the equivalent parts. The photocathode 27 consisting of a plurality of segments of picture element size is supplied with a voltage from the gate control circuit 23 and emits photoelectrons as it is uniformly illuminated by a luminous body 52. A flat-plate of electroluminescent material is suitable for the luminous body 52. Although the control grid is shown as a bar that faces the photocathode segment for simplicity, actually it may be a metallic mesh as explained with respect to said first and second embodiments. A large control grid segment is provided in common with a group of photocathode segments. The secondary-electron multiplier part is a parallel arrangement of thin tubes for secondary-electron multiplication 29A, each supplied a voltage by the electrodes 42A and 43A attached to an input and output ends. The cross section of the multiplying tube 29A is not bigger than the picture-element in size, and one or more tubes 29A are assigned to a picture-element or a photocathode segment. Anode 31A is also divided into segments of picture-element size; each of the segments and the corresponding pin electrode 57 connecting the inside and the outside of the evacuated housing 32 are constructed in a body or connected to each other. A rear electrode 58 is placed under the insulative recording medium 59 at the pin electrodes 57, and this electrode 58 is connected with each of the anodes 31A and the pin electrodes 57 through a high voltage power source E5 and each load resistor 51. These pin electrodes are well known in the facsimile technique. The voltage of the power source E5 is chosen to be slightly lower than a firing potential of discharge between the pin electrodes 57 and the rear electrode 58.

Figure 12:
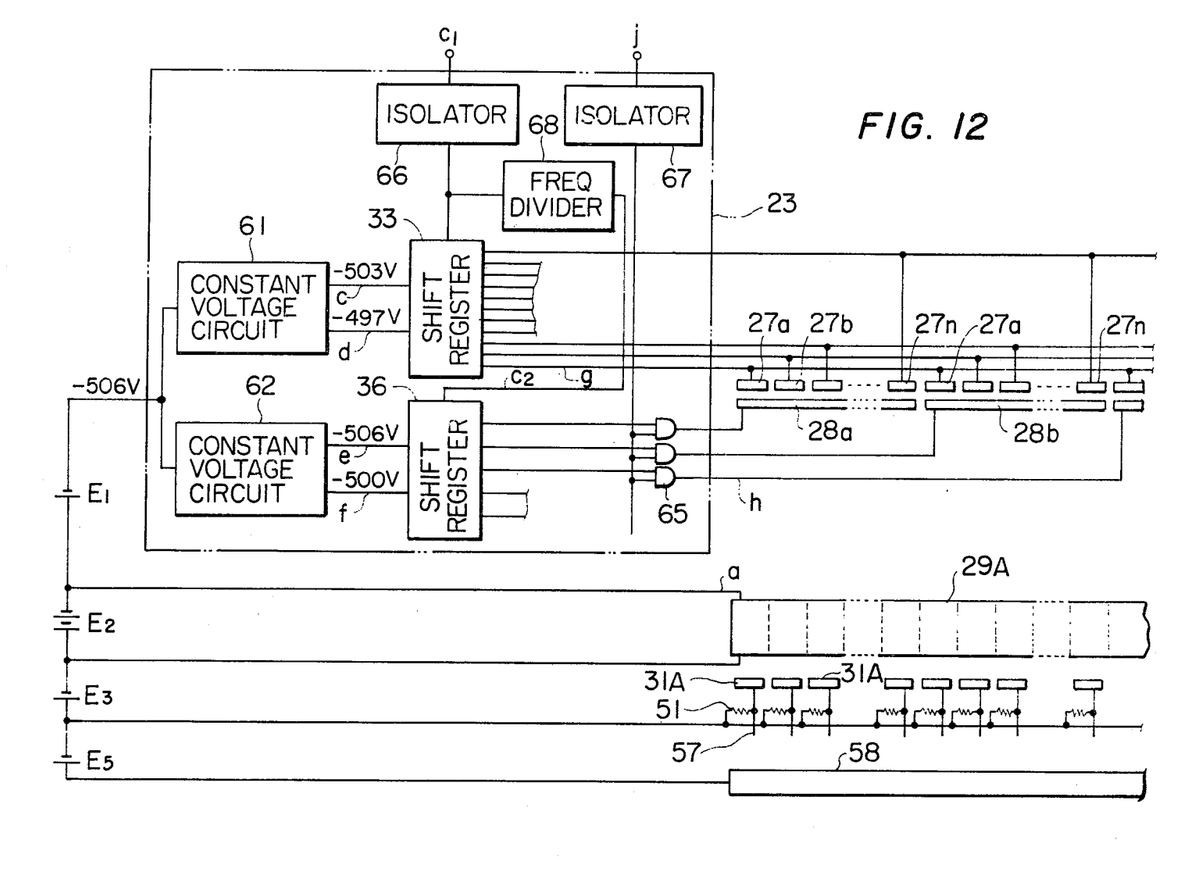
FIG. 12 is a block diagram of the driving circuit in FIG. 11.

FIG. 12 is a block diagram of a driver circuit illustrated for the purpose of explaining a scanning operation of this embodiment, wherein the same reference symbols as in FIGS. 6 and 11 denote corresponding parts. First, an explanation will be made about how to control the grid for the pass of photoelectrons emitted from the photocathodes 27a, 27b... excited by the light source 52. With the input (a) of the secondary electron multiplier 29A as a standard, a power source E1 supplies a voltage (b) of $-506$ volts to a constant voltage circuit 61 which in turn provides voltages (c) and (d) of $-503$ volts and $-497$ volts to be fed to a ring-counter 33. Thus only one of the output terminals of the ring-counter 33, for example terminal g is turned to the ON state, and its voltage becomes $-503$ volts, while the other remain at OFF state, $-497$ volts. These voltages are applied to corresponding photocathode segments, respectively. As shown in the figure, each of the output terminals of said ring-counter 33 is connected to every photocathode segment at the same relative position in the respective groups classified with the grid electrode segments 28a, 28b... Furthermore, two voltages, $-506$ volts (e) and $-500$ volts (f), produced at the constant voltage circuit 62 are fed to the ring-counter 36 and AND gates 65. Consequently, output "0" (in the OFF state) and output "1" (in the ON state) of the ring-counter 36 and the AND gates 65 are $-506$ volts (e) and $-500$ volts (f), respectively. The outputs of AND gates 65 are applied to the grid segments 28a, 28b..., respectively.

When a clock signal $C_1$ is applied to the ring-counter 33 through the isolator 66, one of the output terminals of the counter is selected to be turned on and the selection is shifted by the subsequent clock signal, so that the voltage of the selected one of the photocathode segments 27a, 27b... in each group is changed from $-497$ volts to $-503$ volts (as illustrated in FIG. 7). The said clock pulses $C_1$ are fed to a frequency divider 68 which supplies clock pulses $C_2$ to the ring counter 36. Each output of the ring-counter 36 is applied to one input of each AND gate 65; on the other hand, the time sequential picture signal (j) is applied to another input of the gate 65 through the isolator 67. Therefore, under the condition that the video signal j takes its logic "1," an AND gate 65 selected by the output logic "1" of the ring-counter 36 turns on and drives the corresponding grid segment into its ON state. Thus, the voltages at the grid segments 28a, 28b... are changed in turn from $-506$ volts to $-500$ volts, depending upon the clock signal $C_2$ and the time sequential picture signal (j) (as shown in FIG. 7). When the photocathode segment is at $-503$ volts and the grid electrode segment is at $-500$ volts, the voltage difference between them is $+3$ volts which permits the cathode segment to emit electrons. Under the other conditions, the bias voltage is $-3$ volts or $-9$ volts and photoelectron emission is suppressed. Accordingly, if the ratio of division at the frequency divider 68 is chosen to be equal to the number of the photocathode segments within a group of cathode segments which are placed along one of the control grid segments 28a, 28b..., all the photocathode segments are scanned, for example, from the left end to the right end one by one in FIG. 12. Only when the picture signal is in the "1" state are the photo-electrons emitted from the segment portion or the photocathode segment allowed to pass through the control electrode segment. The photo-electrons, after passing through the control electrode segment, are accelerated by an inter-electrode potential of about 500 volts before reaching the secondary-electron multiplying tube 29A. The electrons multiplied therein are captured at the anode 31A. As a result, a voltage drop occurs in the direction shown in the figure across the load resistor 51. Since the power source E5 provides a voltage slightly lower than the trigger level of the discharge between the pin electrodes 57 connected with the anodes 31A and the rear electrode 58, a voltage across the load resistor 51 will let the discharge start, yielding a certain amount of electrostatic charge on the surface of the insulative recording medium 59 according to the intensity of the picture signal.

As mentioned above, the one-dimensional scanning is performed by means of pin electrodes 57. Accordingly, when the recording system of this invention or the recording medium is moved perpendicularly to the scanning direction, a two-dimensional electrostatic image is produced on the recording medium. The electrostatic image produced as mentioned above is developed by a conventional process into a visible image.

Furthermore, it is obvious that a thermionic emission cathode may be employed in place of the electron emission plate (lumminous body 52 and photocathode 27). The pin electrodes 57 may be replaced by a fluorescent panel generating light in response to the multiplied electrons, for direct exposure of the photosensitive material or formation of electrostatic latent image. It is possible to provide a bunch of secondary electron multiplier tubes 29A for a single picture element. The cross section may be fabricated in arbitrary shape as far as they are divided to attain the desired resolving power in the direction of scanning. It is also obvious that a similar effect will be obtained by using a strip for photocathode 27 in place of cathode segments and dividing the control electrode 28 into a number of segments each having a size capable of obtaining the required resolving power and being independently controllable. Moreover, this embodiment can be applied to a system in which the pin electrode 57 and its cooperative electrode are positioned on the same side of the recording medium 59.

As mentioned above, the further advantage of this embodiment is as follows: Since the voltage, the level of which is slightly lower than the firing potential, is previously applied between the pin electrode 57 and its cooperative electrode (58), a relatively low voltage across the load resistor 51 is enough to control the firing between these two electrodes; therefore, the current through the anode 31A is also small. In addition, owing to the function of electron multiplication as described with reference to the other embodiments, the voltages to be controlled by the control circuit are low, and hence the device of this embodiment can be produced small in size and low in price.

What is claimed is:

1. An electro-optical picture signal processing system comprising:
    a photoelectron emission plane consisting of a number of segments as large as picture-element, arranged in one-dimension and grouped in such manner that each group contains the same number of said segments,
    an image projection device for projecting an optical image of a document on the photoelectron emission plane and permitting each photo-electron emission segment to emit photoelectrons in response to light density of the optical image,
    a plurality of grid electrode segments, each of which faces a group of said photoelectron emission segments for controlling the photoelectron emission therefrom,
    a secondary-electron multiplying device producing secondary-electrons in response to the incidence of photoelectrons from the photoelectron emission segments,
    an electric power source providing a voltage for accelerating said secondary-electrons,
    an anode for capturing multiplied secondary-electrons, and
    a means for scanning the photoelectron emission segments from one end to the other and permitting the electrons from the selected photoelectron emission segment to reach the secondary-electron multiplying device.

2. An electro-optical picture signal processing system according to claim 1 wherein the scanning means comprising:
    a means for selecting one of the photoelectron emission segments in each group to turn it on, while the others remain in the OFF state, and
    a means for selecting one of the grid electrode segments to turn it on, and to leave the others in the OFF state,
    wherein only at the moment when both a photoelectron emission segment and the associated grid electrode segment are ON are, the photoelectrons emitted from the photoelectron emission segment allowed to pass through the grid electrode to the secondary-electron multiplying device.

3. An electro-optical picture signal processing system according to claim 1 wherein said secondary-electron multiplying device comprises two plates arranged in parallel with each other with their secondary electron multipling layers inside, leaving a space for the passage of electrons.

4. An electro-optical picture signal processing system according to claim 2 wherein said secondary-electron multiplying device comprises two plates arranged in parallel with each other with their their electron multipling layers inside, leaving a space for the passage of electrons.

5. An electro-optical picture signal processing system according to claim 3 wherein said grid electrode segments are formed on the surfaces of said plates bearing the secondary-electron multiplying layers so as to be insulated therefrom.

6. An electro-optical picture signal processing system according to claim 4 wherein said grid electrode segments are formed on the surfaces of said plates bearing the secondary-electron multiplying layers so as to be insulated therefrom.

7. An electro-optical picture signal processing system according to claim 3 wherein said grid electrode segments are formed on the surfaces of said plates bearing the secondary-electron multiplying layers so as to contact therewith, and at least parts of said secondary-electron multiplying layers which locate near said grid electrode segments are divided into a plurality of segments along an electron path.

8. An electro-optical picture signal processing system according to claim 4 wherein said grid electrode segments are formed on the surfaces of said plates bearing the secondary-electron multiplying layers so as to contact therewith, and at least parts of said secondary-electron multiplying layers which are located near said grid electrode segments are divided into a plurality of segments along an electron path.

9. An electro-optical picture signal processing system comprising:
    an electron emission plane arranged in one-dimension,
    a grid electrode to control passing of the electrons emitted from the electron emission plane;
    a number of secondary-electron multiplying devices, each of which has a cross section not larger than picture-element size and produces secondary-electrons in response to the incidence of photoelectrons from the electron emission plane,
    an electric power source providing a voltage for accelerating secondary-electrons, and
    an anode consisting of a number of segments as large as a picture-element, for capturing multiplied secondary-electrons,
    wherein at least one of the electron emission plane and the grid electrode is divided into a number of picture-element size segment which are one-dimensionally scanned to select from one end to the other, and further a voltage between the electron emission plane and the grid electrode at selected segment portion is controlled in accordance with a time sequential picture signal.

10. An electro-optical picture signal processing system according to claim 9 wherein one of the electron emission plane and the grid electrode consists of a plurality of segments as larg as picture-element and grouped in such manner that each group contains the same number of said segments, the other consists of large segments which face to said each group of the picture-element size segments, respectively, and when every picture-element size segments at the same relative position in the respective groups is selected to be turned into ON state, the remains are at OFF state, on the other hand when one of the large segments is selected to be turned into ON state, the remains are at OFF state, and consequently only when both of a picture-element size segment and a large segment corresponding to it are turned into ON state, electrons from said segment portion are allowed to pass through the grid electrode.

11. An electro-optical picture signal processing system according to claim 9 further comprising:
pin electrodes connected with the anode segments, respectively,
an electrode cooperating with the pin electrodes,
a high voltage power source for applying a potential slightly lower than a firing potential between said two electrodes, and
an anode load resistance producing a voltage drop to be superposed upon the high potential in order to trigger discharge between said two electrodes,
wherein an electrostatic latent image is produced on an insulative recording medium by secondary-electrons captured at the anode.

12. An electro-optical picture processing system according to claim 10 further comprising:
pin electrodes connected with the anode segments, respectively, an electrode cooperating with the pin electrodes,
a high voltage power source for applying a potential slightly lower than a firing potential between said two electrodes, and
an anode load resistance producing a voltage drop to be superposed upon the high potential in order to trigger a discharge between said two electrodes,
wherein an electrostatic latent image is produced on an insulative recording medium by secondary-electrons captured at the anode.

13. An electro-optical picture signal processing system according to claim 9 wherein the electron emission plane comprises a photoelectron emission plane and a light source for uniformly illuminating the photoelectron emission plane.

14. An electro-optical picture signal processing system according to claim 10 wherein the electron emission plane comprises a photoelectron emission plane and a light source for uniformly illuminating the photoelectron emission plane.

15. An electro-optical picture signal processing system according to claim 11 wherein the electron emission plane comprises a photoelectron emission plane and a light source for uniformly illuminating the photoelectron emission plane.

16. An electro-optical picture signal processing system according to claim 12 wherein the electron emission plane comprises a photoelectron emission plane and a light source for uniformly illuminating the photoelectron emission plane.

* * * * *